United States Patent [19]

Namitz et al.

[11] Patent Number: 5,058,112
[45] Date of Patent: Oct. 15, 1991

[54] PROGRAMMABLE FAULT INSERTION CIRCUIT

[75] Inventors: Walter J. Namitz, Phoenix, Ariz.; Charles S. Chang, Sunnyvale, Calif.

[73] Assignee: AG Communication Systems Corporation, Phoenix, Ariz.

[21] Appl. No.: 387,037

[22] Filed: Jul. 31, 1989

[51] Int. Cl.$^5$ ............................................. G06F 11/00
[52] U.S. Cl. ....................................... 371/3; 371/23; 364/200; 364/267
[58] Field of Search ............... 371/3, 23, 29.1, 27, 371/15.1, 17, 18; 364/200, 900; 324/73.1

[56] References Cited

U.S. PATENT DOCUMENTS

| | | | |
|---|---|---|---|
| 3,465,132 | 9/1969 | Crockett | 371/3 |
| 4,669,081 | 5/1987 | Mathewes | 371/3 |
| 4,759,019 | 7/1988 | Bently | 371/3 |
| 4,835,459 | 5/1989 | Hamlin | 371/3 X |

OTHER PUBLICATIONS

D. Crandall, "Error Generator for I/-O/P Device Attachment", IBM TDB, vol. 25, No. 6, 11/1982, pp. 3045-3049.

"SPD I/O Bus Error Injector and Detector", IBM TDB, vol. 30, No. 11, 4/1988, pp. 12-15.

P. East, "Error Injector for Testing a Data Processing Unit", vol. 17, No. 6, 11/1974, pp. 1691-1692.

Primary Examiner—Robert W. Beausoliel
Attorney, Agent, or Firm—Anthony Miologos; Gregory G. Hendricks

[57] ABSTRACT

A fault insertion circuit is disclosed which generates and applies a fault signal to a digital circuit under test. The fault insertion circuit includes fault insertion hardware connected to the digital circuit under test. The fault insertion hardware is arranged to select, generate and apply the fault signal. A programmable controller and communication circuit are also included. The communication circuit is connected to the controller and to a data terminal, personal computer or any other source of programming commands and instructions. The communication circuit receives the programming commands and instructions from the data terminal and transmits the commands and instructions to the controller. The controller in response to the received commands and instructions transmits control signals to the fault insertion hardware, thereby, generating and applying a fault signal to the digital circuit under test.

3 Claims, 2 Drawing Sheets

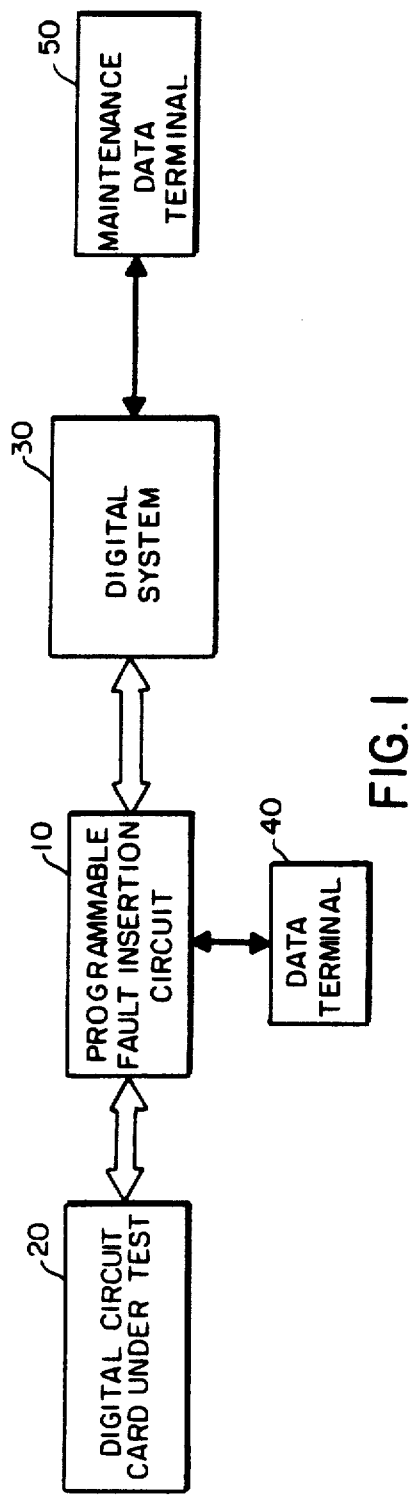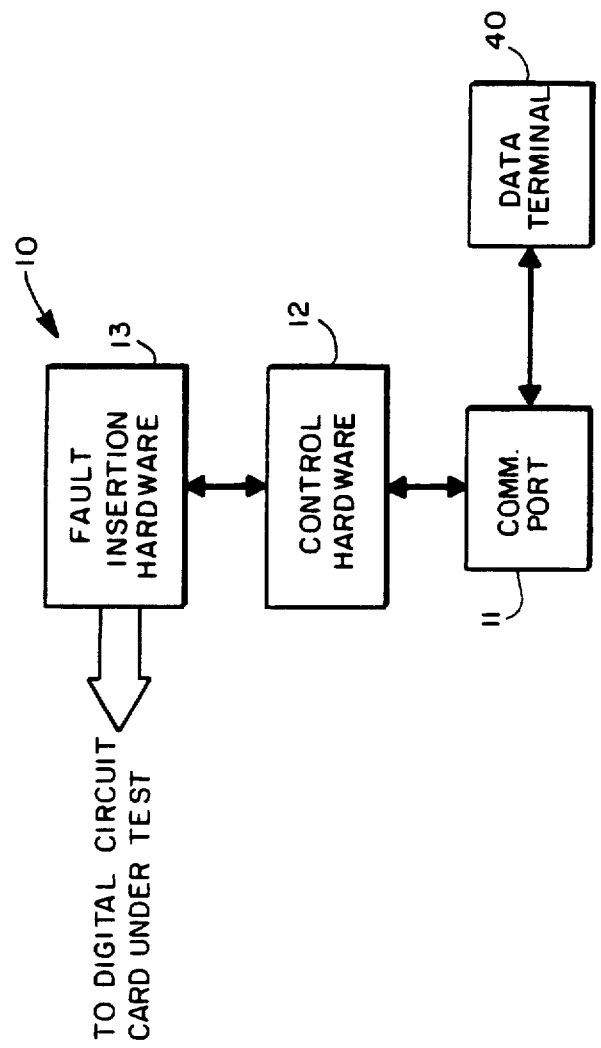
FIG. 1
FIG. 2

PROGRAMMABLE FAULT INSERTION CIRCUIT

CROSS REFERENCE TO RELATED APPLICATIONS

Cross Reference is made to the related U.S. patent application entitled: "A PROGRAMMABLE FAULT INSERTION ARRANGEMENT AND METHOD," Ser. No. 07/387,038 filed on the same date, and by the same inventors as this Application and now abandoned.

FIELD OF THE INVENTION

The present invention relates to the field of electronic test devices, and more particularly, to a programmable device for inserting faults into an electronic digital circuit.

BACKGROUND OF THE INVENTION

Fault insertion is the means by which logic faults are introduced into an electronic digital circuit. Logic faults are operator induced logic signals such as a logic "high" or logic "low" that are deliberately injected into a digital electronic circuit. The circuit is then monitored to ascertain if it responded correctly to the fault. For example, in a digital circuit having the capability to sense such failures and to send messages to a controller, an inserted fault should solicit a trouble message to the controller from the circuit. A failure to send a trouble message would indicate a problem with the maintenance functions of the circuit under test. Additionally, faults may be inserted into a circuit under test to ascertain how the circuit operates under the faulted conditions.

Presently, fault insertion is a tedious manual process carried out by a craftsperson or technician. The technician using jumper wire, or a similar tool, attaches one end of the jumper to a connector pin of the device under test and grounds the other end. In a digital logic system this would simulate a logic "Low" or "0" state. The technician would then monitor and interpret the operating conditions of the circuit under test using either a test terminal and monitor, an oscilloscope or any other means commonly known for testing the performance of digital circuits. The process is then repeated for each fault inserted into the circuit under test.

Manual fault insertion has disadvantages in that it is extremely time consuming, and it is prone to human error. Additionally, without special equipment only logic "0" faults could be inserted into the circuit under test. The logic "0" only fault insertion, tends to be incomplete and therefore inefficient for the proper testing of digital circuits.

Accordingly, it is an object of the present invention to provide a fault insertion circuit which can be programmed by an operator to automatically apply fault signals to a digital circuit under test.

DISCLOSURE OF THE INVENTION

The above and other objects, advantages, and capabilities of the present invention are realized in a fault insertion circuit arranged to generate and apply a fault signal to a digital circuit under test.

The fault insertion circuit of the present invention includes fault insertion hardware connected to the digital circuit under test. The fault insertion circuit includes a plurality of outputs with each output connected to a respective input of the digital circuit under test. The fault insertion hardware includes a plurality of fault generating circuits, with each fault generating circuit associated with a respective fault insertion circuit output. A selection logic circuit is also included for enabling a respective one of the fault signal generating circuits.

A programmable controller is connected to the selection logic circuit and is arranged under program control to send control signals to the selection logic circuit. A communication circuit is connected to the controller circuit and to a data terminal, personal computer or any other source of programming commands and instructions.

The communication circuit is arranged to receive the commands and instructions from the data terminal and to transmit the program commands and instruction to the controller. The controller, in response to the received program commands and instructions, transmits the appropriate selection control signals to the selection logic circuit. The selection logic circuit then enables the selected fault generating circuit applying the fault signal to the digital circuit under test.

BRIEF DESCRIPTION OF THE DRAWINGS

A better understanding of the invention may be had from the consideration of the following detailed description taken in conjunction with the accompanying drawings in which:

FIG. 1 is block diagram showing the programmable fault insertion circuit connected to a digital circuit card under test in a digital system, in accordance with the principles of operation of the present invention;

FIG. 2 is a block diagram showing the major functional areas of the programmable fault insertion circuit, in accordance with the principles of operation of the present invention; and, FIG. 3 is a detailed block diagram of the fault insertion circuit, in accordance with the present invention.

DESCRIPTION OF A PREFERRED EMBODIMENT

Figure 3:
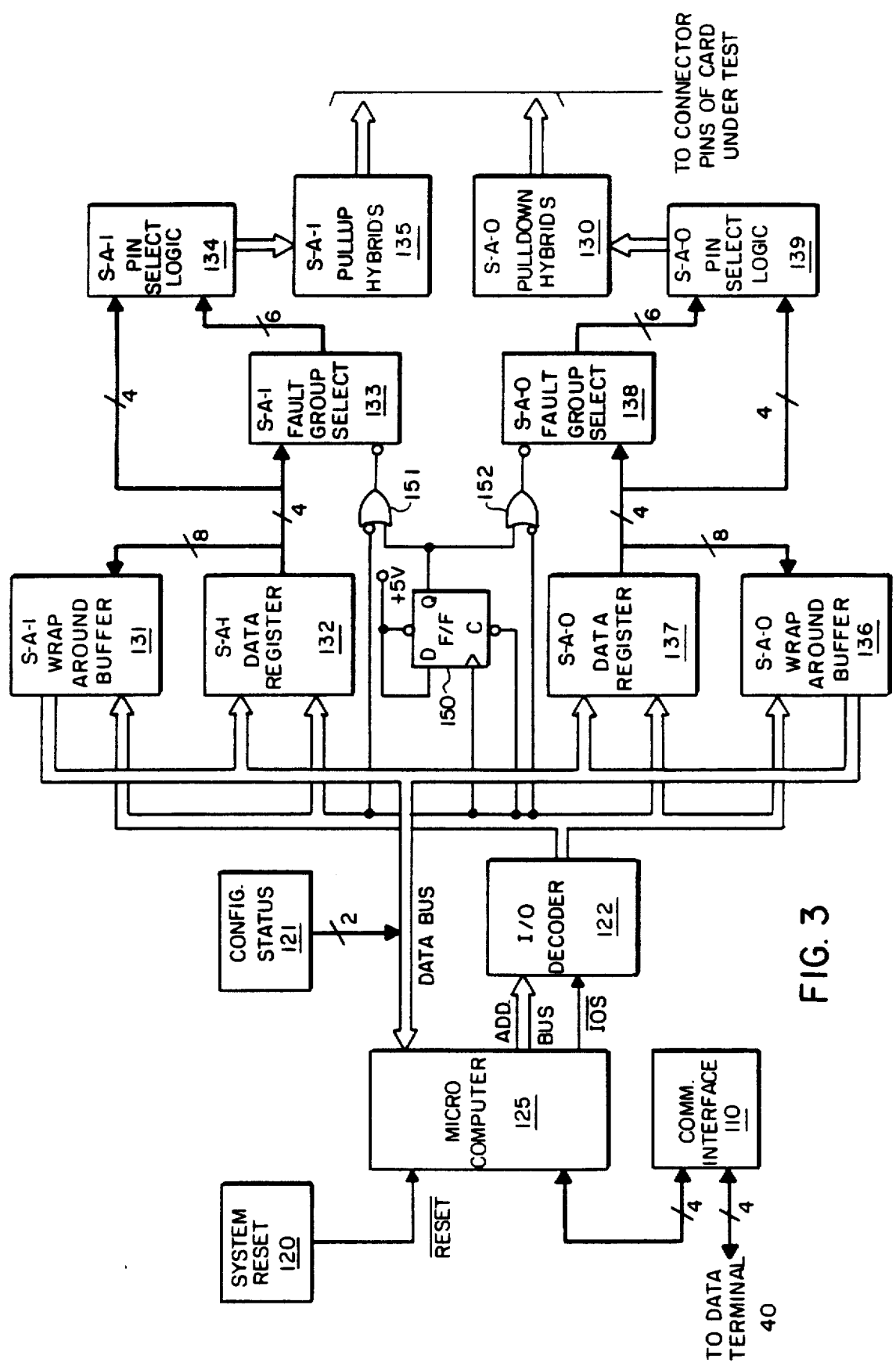

Directing attention first to FIG. 1, depicted therein, is the Programmable Fault Insertion Circuit (PFIC) in accordance to the principles of operation of the present invention. As can be seen, the PFIC 10 is connected between a Digital Circuit Card (DCC) 20, that is to be tested and a Digital System (DS) 30. The DCC 20 is a functional subsystem of DS 30. A data terminal 40 is connected to the PFIC 10. The data terminal 40 is used to issue commands to PFIC 10, in order to insert faults into the DCC 20. A maintenance data terminal 50, is connected to the DS 30 and is used to receive error or warning messages sent by DS 50 in response to the PFIC 10 inserted faults. It is contemplated that the PFIC 10 is connected between the DCC 20 and the backplane Bus of the DS 50, via a pair of connectors (not shown) much in the same manner as a circuit card extender.

With reference now to FIG. 2, the major functional areas of PFIC 10 will now be explained. The PFIC 10 is comprised of three functional areas, the communication port 11, the control hardware 12 and the fault insertion hardware 13.

The communication port is used to receive and send data from the data terminal 40. In the present embodiment the communication port 40 utilizes the EIA RS232C specification for communication between the PFIC 10 and the data terminal 40. This provides for an industry standard data connection between the PFIC 10 and the data terminal 40 or a Personal Computer (PC). Therefore, any PC having a RS232C serial interface can act as the data terminal 40 to send and receive operating instructions to the PFIC 10.

It will be appreciated by those skilled in the art that other types of data communication standards or protocols can be used to provide communication between the PFIC 10 and the data terminal 40 and the present invention is not limited thereto.

The control hardware 12 consists of the circuitry which interprets and executes the data instructions and commands sent to the PFIC 10 from the data terminal 40. The commands perform diagnostics and induce or remove faults. In this embodiment the control hardware is comprised of a microcomputer of the type which includes in single device a microprocessor, read only memory, random access memory, timing, and I/O capabilities.

The fault insertion hardware is the functional circuitry which under control of the control hardware creates and applies to the selected connector pins of the DCC 20 the requested faults.

The fault insertion hardware is configured to provide the following fault types:
  Stuck at 1 (S-A-1), a signal having a logic "1" value;
  Stuck at 0 (S-A-0), a signal having a logic "0" value; and
  Oscillation Fault, a signal which alternatively pulled to a logic "0" and logic "1" state, creating a square wave.

Referring now to FIG. 3, a detailed explanation of the programmable fault insertion circuit in accordance with the present invention will now be given.

The communication interface 110 is comprised of a RS232 Transmitter/Receiver (TR) circuit, which connects the data terminal 40 to the serial communication ports of controller 12. The RS232 TR circuit, uses an asynchronous serial link, including a handshaking protocol, for transferring information to/from the communication interface 110 and the data terminal 40. The signals used by the TR circuit are: Data transmitted (DT), Data Received (DR), Clear to Send (CTS) and Data Terminal Ready (DTR). The interface is contemplated to transfer information along the serial link at 9600 Baud with each data byte composed of 7 bits of data, one even parity bit, one start bit and one stop bit.

The control hardware 12 includes a microcomputer 125, a system reset circuit 120, a configuration status circuit 121, and a I/O decoder 122. The microcomputer 125 includes Read Only Memory (ROM), were the PFIC's 10 operating program is stored, Random Access Memory (RAM), for the temporary storage of data, and a serial communication interface. The serial communication interface connects the microcomputer 125 to the communications interface 110.

The system reset circuit 120, powers up the microcomputer 125 properly, by providing a reset signal that remains low for at least 20 ms.

The configuration status circuit 121, is a hardwired circuit which provides data to the microcomputer 125 that identifies the type of PFIC 10 the microcomputer is controlling. Since there are a great variety of circuit cards with different connector pin configurations, such as 98 pin upper/98 pin lower connector double height cards, or 98 pin connector single height cards more than one type of PFIC 10 must be produced and used. Therefore, instead of generating two or more operating programs to control each type of card, it is more efficient to write a single operating program which can control both types of PFICs. Thus, the microcomputer 125 checks which type of card it is installed on by reading the configuration status circuit 121 and uses the appropriate portions of the operating program for the proper operation of PFIC.

The I/O decoder 122 is a single 3/8 decoder device that is connected to the microcomputer's 125 address bus. I/O decoder 122 decodes addresses generated by the microcomputer 125 into control signals that enables the fault insertion hardware within the I/O address space. Signal IOS/ selects decoder 122 whenever a valid I/O address appears on the address bus.

The fault insertion hardware consists of two groups of identical components. The first group generates and applies the S-A-1 faults and the second group generates and applies the S-A-0 faults. The first group includes an S-A-1 wrap around buffer 131, an S-A-1 data register 132, an S-A-1 fault group select 133, S-A-1 pin select logic 134, and S-A-1 pullup hybrid devices 135. Similarly, the second group includes an S-A-0 wrap around buffer 136, an S-A-0 data register 137, an S-A-0 fault group select 138, S-A-0 pin select logic 139, and S-A-0 pulldown hybrid devices 130. Additionally, the fault insertion hardware includes a diagnostic control flip flop (F/F) 150, used to allow diagnostics to be run on the fault insertion hardware.

The wrap around buffers 131 and 136 are connected to the microcomputer's 125 data bus and are used during diagnostics. When F/F 150 is set, the fault group select decoders 133 and 138 are disabled allowing data written to the data registers 132 and 137 to be read back to the microcomputer via wrap around buffers 131 and 136. The wrap around buffers 131 and 136 are enabled by signals generated by the I/O decoder 122.

The data registers 132 and 137 are eight bit register devices connected to the microcomputer's 125 data bus. Each register divides the stored data into an upper and lower nibble (4 bits). The lower nibble is used to select one of sixteen pins within the appropriate S-A-1 or S-A-0 fault group. The upper nibble selects one of six appropriate S-A-1 or S-A-0 fault groups. The data registers are written to by the microcomputer 125 by an enable signal generated by the I/O decoder 122.

The fault group select decoders 133 and 138 receive the upper nibble from its associated data register 132, 137 and generate an enable signal to one of the six fault groups of the pin select logic devices 134, 139 respectively. The fault group select decoders 133, 138 are normally active unless deselected by gates 151 and 152 respectively, when diagnostics are run. Only one fault group can be active at any one time.

Each pin select logic 134, 139 consists of six 4/16 decoders. Each decoder corresponds to a one of six fault groups within the S-A-1 and S-A-0 fault type. The enabling signals generated by the group select decoders selects one of the six pin select decoders. One of the sixteen pins of each decoder is then selected by the decoding of the lower nibble of data from the associated data register 132, 137. The pin select signal is then applied to the associated pullup hybrid 135 or pulldown hybrid 130.

The hybrid devices 135 and 130, are a plurality of discrete transistor and resistor combinations which apply the S-A-1 or S-A-0 signals respectively, to the DCC 20. Each transistor resistor combination receives an enabling signal from its associated pin select decoder and produces and applies the appropriate fault to the DCC 20.

With renewed reference to FIGS. 1 and FIG. 3, an explanation of the operation of PFIC 10 will now be given. After the PFIC 10 is installed to the DCC 20 and powered up, an initialization and diagnostics routine is run by microcomputer 125. The microcomputer 125 issues an address Which is decoded by the I/O decoder 122. I/O decoder 122 generates a set signal which is applied to the clock input of F/F 150. The Q output of the now set F/F 150, is applied to gates 151 and 152 which deselect the S-A-1 and S-A-0 fault group select decoders. The microcomputer then writes a byte of data into each of the data registers 132, 137. After the data has been written to the data registers 132, 137 the microcomputer 125 via the appropriate wrap around buffer 131, 136 reads the data back and checks that the data read back is correct. If the data read back is correct the I/O decoder 122 generates a reset signal which is applied to the C (clear) input of F/F 150, resetting the fault insertion hardware for normal operation. The diagnostic routines also check the microcomputer 125 RAM space, a checksum of the program ROM and the integrity of the communication link, by checking for even parity on the incoming data. Any hardware failures are stored as data in the microcomputer's 125 RAM and transmitted to the data terminal 40 as a response to a prompt request.

The fault generation and insertion sequence between data terminal 40 and the PFIC 10 begins when the data terminal 40 issues a command to PFIC 10 requesting a prompt. If all diagnostics are successfully completed, the PFIC 10 sends to the data terminal 40 a character describing the PFIC 10 card type. This data is read by the microcomputer 125 from the configuration status circuit 121. If the PFIC 10 fails diagnostics a character is returned indicating a hardware problem.

If a valid prompt is sent to the data terminal 40 from the PFIC 10, the data terminal 40 then transmits a command to the PFIC 10 to induce a fault. The command between the data terminal 40 and the PFIC 10 has the following structure:

I - Command Type, this could either be I (Insert) or R (reset).

1 - Card number, refers to the number of card under test addressed.

U - Sector, refers to the portion of the card under test where the pin to be faulted is located. This could be U (upper) or L (lower) for a double height card, or S (single) for a single height card.

00 - Pin number, refers to number of the pin to be faulted.

H - Fault type, refers to the type of fault to be inserted; H (high), L (low) or 0 (oscillation).

0000 - Duration time, refers to the length of time, in milliseconds, a high or low fault is to be maintained.

0000 - High time, refers to the length of time, in milliseconds, an oscillation fault is to remain high.

0000 - Low time, refers to the length of time, in milliseconds, an oscillation fault is to remain low.

Using the command structure just described, a fault can be induced into the DCC 20 by transmitting to the PFIC 10 the following command message.

I 1 S 10 H 0025 0000 0000

This command message will insert a S-A-1 signal on pin number ten of the DCC 20 having a duration of 25 ms.

The transmitted message is read and interpreted by the microcomputer 125, which sends an appropriate address to the I/O decoder 122. The decoder 122 enables the correct data register, in this example the S-A-1 data register 132 and the fault group select decoder 133.

The microcomputer 125 sends over the data bus a byte of data containing the fault group select and pin select data to the S-A-1 data register 132. After the data is read into the data register 132, the lower nibble of the data byte is transmitted to the S-A-1 pin select logic 134, and the higher nibble sent to the S-A-1 fault group select 133. The higher nibble is decoded by fault group select 133 and the appropriate decoder of the pin select logic 134 is enabled. The enabled pin select logic decoder 134 reads the low order nibble and the pullup hybrid associated with the DCC 20 pin number 10 is activated to induce a S-A-1 fault for the commanded duration time.

When the time duration is completed the fault is removed and a command completed response is transmitted to the data terminal 40 from the PFIC 10. The PFIC is then ready to accept another fault insertion command from the data terminal 40. The results of the fault induced into the DCC 20 can then be monitored via the DS 30 maintenance data terminal 50.

It is, however, useful to underscore some of the salient attributes of the subject invention. It will be well understood by those skilled in the art that the present invention provides for the ability to communicate with a data terminal or a PC to automatically insert faults under the terminal's or PC's direction. The insertion can be under the direction of an operator or under the direction of a program written to execute a specific sequence of faults into the digital system. The present invention easily allows a technician to write a test plan which would run on a PC, that would automatically insert faults into the digital system hardware and collect the test data to be analyzed at a later time or date.

Furthermore, it will be obvious to those skilled in the art that numerous modifications to the present invention can be made without departing from the scope of the invention as defined by the appended claims. In this context, it should be recognized that the essence of the invention resides in a fault insertion circuit which can be programmed by an operator, a data terminal or a personal computer to automatically apply a plurality of faults into a digital system, in order to ascertain if the digital system is operating properly.

What is claimed is:

1. A fault insertion circuit arranged to generate and apply a fault signal to a digital circuit under test, said digital circuit under test including an input connector having a plurality of input pins, said fault insertion circuit comprising;

fault insertion hardware connected to said digital circuit under test, said fault insertion hardware including at least one output connector having a plurality of output pins, said fault insertion hardware output connector connected to said digital circuit under test input connector with each pin of said output connector pin mated to respective pin of said input connector, said fault insertion hardware further including a plurality of fault signal generating circuits, each fault signal generating circuit connected to a respective output connector pin, and selection logic circuits for selecting and enabling a respective one of said plurality of fault signal generating circuits;

a microcomputer circuit connected to said selection logic circuits, said microcomputer circuit under direction of an operating program is arranged to control said selection logic circuits;

a communication circuit connected to said microcomputer circuit and to a source of commands and instructions, said communication circuit arranged to receive commands and instructions from said source of commands and instructions and to transmit said commands and instruction to said microcomputer circuit, and said microcomputer circuit in response to said received commands and instructions and under direction of said operating program interprets said commands and instructions and transmits control signals to said selection logic circuits, enabling a respective one of said plurality of fault signal generating circuits and applying the fault signal generated therefrom to said digital circuit under test;

said microcomputer circuit, under direction of said operating program transmits to said selection logic circuits control signals disabling said enabled signal generating circuit, and responsive to the disabling of the enabled signal generating circuit said microcomputer transmits a completion signal to said communication circuit, whereby, said completion signal is transmitted to said source of commands and instructions;

said microcomputer circuit comprising a microcomputer;

maintenance control means connected between said microcomputer and said selection logic circuits;

data transfer storage means connected between said microcomputer and said selection logic circuits; and data return storage means connected to said microcomputer and further connected to said data transfer storage means;

said microcomputer being operated to provide a maintenance enable signal and a maintenance disable signal, and further operated to provide data signals for control of said selection logic circuits;

said maintenance control means being operated in response to said maintenance enable signal to provide a selection logic disable signal, and further operated in response to said maintenance disable signal to provide a selection logic enable signal;

said data transfer storage means being operated to store said data signals and provide stored data signals;

said selection logic circuits being operated in response to said selection logic enable signal and a particular arrangement of said stored data signals to select and enable said respective one of said plurality of fault signal generating circuits;

said selection logic circuits being further operated in response to said selection logic disable signal to inhibit said selection and enabling of said fault signal generating circuits;

said data return storage means being operated to store said stored data signals and to provide data return storage signals; and said microcomputer being further operated to retrieve said data return storage signals and to compare them with said data signals.

2. A fault insertion circuit as claimed in claim 1, wherein said maintenance control means comprises a flip-flop.

3. A fault insertion circuit as claimed in claim 1, wherein a first group of said fault signal generating circuits is operative to provide fault signals of a first characteristic, and a second group of said fault signal generating circuits is operative to provide fault signals of a second characteristic; said maintenance control means comprising:

a D-type flip-flop having its clock and clear inputs connected to said microcomputer; and first and second gating means, each having a first input connected to the Q output of said D-type flip-flop and a second input connected to said microcomputer;

said selection logic circuits comprising a first selection logic circuit connected to the output of said first gating means, and a second selection logic circuit connected to the output of said second gating means;

said first selection logic circuit being operated in response to said selection logic enable signal and each particular arrangement of a first group of said stored data signals to select and enable a respective one of a first group of said plurality of said fault signal generating circuits which provide said fault signals of a first characteristic; and said second selection logic circuit being operated in response to said selection logic enable signal and each particular arrangement of a second group of said stored data signals to select and enable a respective one of a second group of said plurality of said fault generating circuits which provide said fault signals of a second characteristic.

* * * * *